US005464681A

United States Patent [19]

Luce

[11] Patent Number: 5,464,681

[45] Date of Patent: Nov. 7, 1995

[54] REPLACEABLE ADHESIVE DISPLAY

[75] Inventor: Richard J. Luce, Milwaukee County, Wis.

[73] Assignee: Service Litho-Print, Inc., Oshkosh, Wis.

[21] Appl. No.: 88,206

[22] Filed: Jul. 6, 1993

Related U.S. Application Data

[63] Continuation-in-part of Ser. No. 954,488, Sep. 30, 1992, abandoned.

[51] Int. Cl.[6] ........ B32B 3/00

[52] U.S. Cl. ........ 428/195; 428/40; 428/202; 428/203; 428/204; 428/207; 428/343; 428/352; 428/353; 428/457; 428/537.5; 40/594; 427/208.4; 427/208.8

[58] Field of Search ........ 428/40, 195, 201, 428/202, 203, 204, 207, 211, 343, 352, 353, 457, 458, 537.5; 40/594, 611; 427/208.4, 208.8

[56] References Cited

U.S. PATENT DOCUMENTS

| | | | |
|---|---|---|---|
| 3,166,186 | 1/1965 | Karn | 206/56 |
| 4,351,124 | 9/1982 | Sivertsen et al. | 40/158 B |
| 4,374,883 | 2/1983 | Winslow | 428/40 |
| 4,487,872 | 12/1984 | Takemoto et al. | 524/127 |
| 4,563,388 | 1/1986 | Bonk et al. | 428/304.4 |
| 4,619,858 | 10/1986 | Dam et al. | 428/211 |
| 4,671,003 | 6/1987 | Vitol | 40/2 R |
| 4,695,077 | 9/1987 | Pretre | 283/81 |
| 4,735,837 | 4/1988 | Miyasaka et al. | 428/40 |
| 4,783,354 | 11/1988 | Fagan | 428/40 |
| 4,985,302 | 1/1991 | Sala et al. | 428/343 |
| 5,001,002 | 3/1991 | Gribbin et al. | 428/245 |
| 5,192,612 | 3/1993 | Otter et al. | 428/355 |
| 5,246,763 | 9/1993 | Murschall et al. | 428/195 |
| 5,290,067 | 3/1994 | Langen | 283/60.1 |
| 5,330,232 | 7/1994 | Smith | 283/81 |

*Primary Examiner*—Patrick J. Ryan
*Assistant Examiner*—Marie R. Macholl
*Attorney, Agent, or Firm*—R. Jonathan Peters

[57] ABSTRACT

This invention relates to a replaceable adhesive display comprising a paper, metallized paper, or foil substrate printed on one or both sides with the same or different images, and at least one side is provided with a transparent overlay. The exposed surface of the plastic film overlay is coated with a pressure-sensitive, replaceable adhesive, but in order to achieve proper bonding between the overlay and the adhesive, the overlay surface is treated to enhance the bond between the overlay and adhesive. Following the surface treatment, the overlay is coated with a pressure-sensitive, replaceable adhesive. When the display is removed or peeled from the mounting surface, there is a relatively clean separation at the interface between the adhesive and the surface of the adherend, and substantially no residue remains on the surface. The adhesive is reusable or resealable and permits remounting the display many times. Preferably, a quick-release member is provided over the coating to protect the coating.

21 Claims, 1 Drawing Sheet

REPLACEABLE ADHESIVE DISPLAY

This application is a continuation-in-part application of Ser. No. 07/954,488, filed on Sep. 30, 1992 (now abandoned).

FIELD OF THE INVENTION

This invention relates to a replaceable adhesive display. More particularly, this invention relates to a paper or foil display bearing on at least one facing a pressure sensitive, replaceable adhesive, adaptable for release-bonding to an adherend or mounting surface and when removed leaving substantially no residue.

BACKGROUND OF THE INVENTION AND PRIOR ART

Posters, signs, placards, decals, and similar devices printed with advertising such as for food, beverages, apparel, services, etc, are often displayed on windows, walls, cases, counter tops, etc., of stores, restaurants, service stations, and other retail establishments. (As used herein and in the appended claims, the term "display" is intended to include all such advertising devices.) The display may be printed with an image on one side only or on both sides. Further, in the case of a two-sided display, the display may be printed with the same image on both sides, optionally with the images in or out of registry, or printed with different images on each side. These displays are typically used in connection with a particular advertising campaign which lasts for only a limited period of time. That is, an advertising display mounted on a window or wall is removed after a relatively short period of time, usually within a few days to several weeks.

Advertising displays of this type are generally known to the advertising and printing industries, and are disclosed in the prior art, but the displays known utilize a plastic substrate because the plastic is durable and transparent to light. For example, U.S. Pat. No. 4,879,161 discloses a method for printing a double-sided display on a transparent plastic film or substrate having electrostatic adhering characteristics. The plastic film substrate, e.g. polyvinyl chloride or polyvinyl acetate, adheres to a glass or plastic mounting surface by a static electrical charge and by a partial vacuum. The double-sided display image is printed on one side of the plastic substrate, and the opposite side bearing the electrostatic properties is mounted on the glass window. Because the film is transparent, the image can be seen from both sides of the mounting surface such as a window.

As another example, U.S. Pat. No. 4,900,604 discloses a self-adherent, removable applique. The applique, which is adapted especially for use in a wall decorating system, comprises a thin, plastic vinyl substrate having an image printed on one side, and a reusable, non-permanent adhesive on the opposite side.

Plastic displays of this type as disclosed in the prior art, however, are relatively expensive not only because plastic film is expensive but because printing on plastic is difficult and requires special inks and special handling. Also, plastic displays viewed by reflective light have a tendency to appear dull or faded or to lose detail. Equally important, these plastic displays require a relatively strong bonding adhesive, and when the display is removed from its mount, an adhesive residue or mark off is noticeable, which typically needs to be scraped off the mounting surface. Further, if the adhesive is applied to the print side, or if both sides of the substrate are printed, a strong adhesive may pull away some of the ink, leaving it, along with the adhesive residue, on the mounting surface. These problems of expense, adhesive residue and special inks have limited the use of these displays.

This invention has, therefore, as its object to provide a paper or foil display coated with a replaceable adhesive leaving substantially no mark off or residue when removed from the adherend surface. It is another object of the invention to provide such a display having a transparent overlay bearing a pressure sensitive, replaceable adhesive which can be attached or mounted repeatedly to a surface. Still another object of the invention is to provide such a display overcoming the problems or deficiencies of the prior art structures.

SUMMARY OF THE INVENTION

In accordance with the present invention, I provide a replaceable adhesive display for presenting an image printed on a substrate of paper, metallized paper or foil, and bears or is coated with a pressure-sensitive, replaceable adhesive leaving substantially no mark off or residue when removed from its mounting. The invention utilizes paper or foil stock commonly available in the printing industry as the substrate material, and as used herein the term paper or foil as the printed substrate is intended to include metallized paper. Paper is particularly advantageous in that it provides a significant cost saving in that paper is substantially cheaper than plastic substrate materials, normally does not require special inks, and exhibits better ink holdout. In addition, a paper substrate presents a clearer, sharper, and more aesthetically pleasing image than plastic substrates. Metallized paper or aluminum foil is desirable because of its metallic, reflective appearance. The substrate (paper or foil) is printed on one or both sides with the same or different images, and at least one side is provided with a transparent overlay. In accordance with one embodiment of the invention, one side or facing of the substrate is printed, and the opposite side or facing is provided with an overlay of a transparent plastic film which protects the display and facilitates handling. The exposed surface of the plastic film overlay is coated with a pressure-sensitive, replaceable adhesive, but in order to achieve proper bonding between the overlay and the adhesive, the overlay surface is treated to enhance the bond between the overlay and adhesive. This surface treatment may include .surface activation by corona discharge treatment, ultraviolet irradiation treatment, plasma treatment, flame treatment, chemical etching, or the like; or where desired, the surface treatment may comprise coating the overlay with a size such as an adhesive or resin which is allowed to dry before application of the replaceable adhesive. Following the surface treatment, the overlay is coated with a pressure-sensitive, replaceable adhesive having a bonding strength to the overlay greater than to the adherend or mounting surface, and the cohesion of the adhesive is greater than the bonding strength of the adhesive to the adherend surface. Thus, when the display is removed or peeled from the mounting surface, there is a relatively clean separation at the interface between the adhesive and the surface of the adherend, and substantially no residue remains on the surface. Additionally, the pressure-sensitive, replaceable adhesive should exhibit sufficient tack so that the display can be mounted, including mounting in a vertical position as on a window, and thereby form an adequate bond of measurable strength immediately on contact with the adherend. Further, the adhesive should be reusable or resealable in order to permit remounting the display many times. Preferably, a quick-release member is provided over the coating to protect the coating, which is removed at the time the display is ready for application to the mounting surface.

Where desired, the printed side or facing of the paper or foil substrate may be provided with the plastic overlay, and coated with adhesive as described above. Alternatively, the adhesive coating is disposed on the back side only of the substrate (i.e. the side opposite the print side), and both sides of the substrate are provided with the plastic overlay in order to protect the print from smudges, scratches, tearing or fading. Thus, one or both sides of the substrate is provided with the overlay, and a side bearing a plastic overlay is provided with a replaceable adhesive coating for mounting to a surface.

The term "replaceable adhesive" or "removable adhesive" as used in this specification and in the appended claims, are well known and commercially available adhesives. These replaceable adhesive are different from what is commonly known as "permanent adhesive" which, once a material is applied to an adherend, the material cannot be removed without destruction of the substrate. For example, removing a sticker from a magazine cover or removing a bumper sticker from a car results in tearing the sticker, because the bonding strength of the adhesive is greater than the internal strength of the sticker. In contrast, a "replaceable adhesive" (or "removable adhesive" or like terms employed by the industry) is defined as an adhesive for a mounted item which can be repeatedly removed from the mounting surface and repositioned thereon without significant loss of adhesive properties so that the item is resealable to the surface, and when removed substantially no adhesive residue remains on the surface.

BRIEF DESCRIPTION OF THE DRAWINGS

The drawings, which constitute a part of the specification and include exemplary embodiments of the present invention, include the following.

DETAILED DESCRIPTION OF THE INVENTION

As explained above, the invention is applicable to paper, metallized paper, and foil as the substrate, but is explained herein below with particular reference to a paper substrate.

In the printing arts such as offset lithography, letterpress, gravure, and silk screen, the image area is produced in halftones which rely on dots to create an illusion of tones. Halftone is a special type of photography used in printing, and by this technique the halftone negative is transferred to the surface of the printing plate as tiny dots, each of which carry ink from the plate, directly or indirectly, to the paper. A gradation of tone is reproduced by this pattern or combination of small and large dots. The dots forming the halftone copy are too small to be seen with the naked eye, and because the dots vary in size, there is created the illusion of shading or continuous-tone image. If the dots are small and widely spaced, the image area on the paper will appear to be light; but large and closely spaced dots create a dark image area. That is, for an image area reproduced in halftones, the lightest parts, called highlights, contain very small dots, and the darkest areas, called shadows, contain large size dots. The shades between these two are called middle tones. Halftone, therefore, can produce tone values ranging from near white to near black.

The tonal range is expressed in percent dots, and dot percentage is measured by the size of the dots. In a dot size comparator, 5% dots constitute a highlight area, that is, 95% of the copy is near white and 5% is covered with black dots; and in the shadow areas, 95% of the copy is near black and 5% carries white space. In conventional halftone printing by lithography, 4-color process printing is used for reproducing full color photographs. In the 4-color process, the four standard colors used are cyan, magenta, yellow, and black. From these, the entire color spectrum can be achieved. Other solid colors can be used in conjunction with the 4-color process to enhance the color spectrum. This technique of halftone photography is well known in the graphic arts industry, and although the present invention utilizes halftone reproduction, it should be understood that halftone photography, per se, is not part of this invention.

The invention is described hereinbelow with particular reference to printing the advertising display by offset lithography, but it should be understood that other printing processes which can utilize the halftone technique are also applicable.

Figure 1:
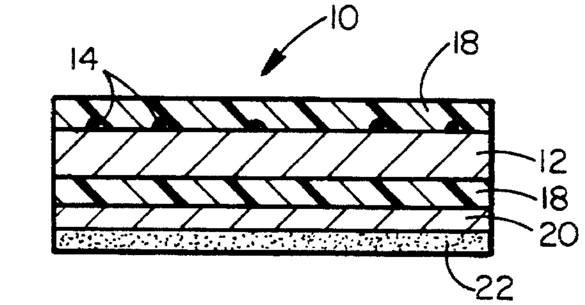
FIG. 1 is a cross-sectional view of a replaceable adhesive advertising display made in accordance with the teachings of the present invention, with the dimensions exaggerated for purposes of clarity, and showing an image printed on one side of a substrate and a replaceable adhesive applied to the opposite side.
Figure 2:
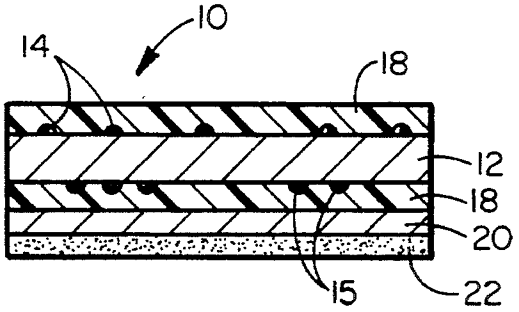
FIG. 2 is an exaggerated cross-sectional view of a replaceable adhesive advertising display with different images printed on the two sides of the substrate.
Figure 3:
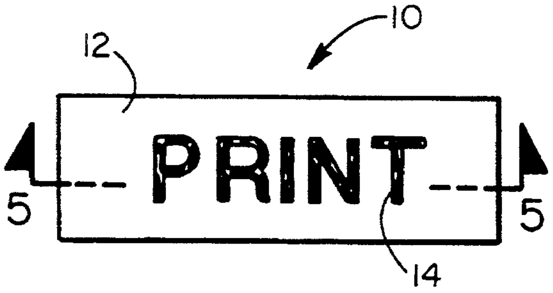
FIG. 3 is a plan view of a replaceable adhesive display showing a right reading image printed on the front facing of the substrate.
Figure 4:
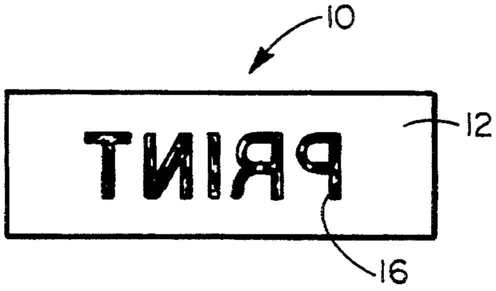
FIG. 4 is a plan view of the display of FIG. 3 but showing the reverse image printed on the back facing of the display.
Figure 5:
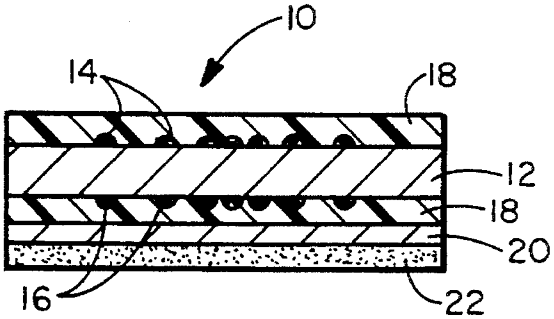
FIG. 5 is an exaggerated cross-sectional view of the display shown in FIGS. 3 and 4 with the same image printed on each side and with a replaceable adhesive coating on one side thereof.

In accordance with the embodiment shown in FIG. 1, there is shown an advertising display indicated generally by the numeral 10 comprising a paper substrate 12 printed on one side only with an image 14. This single-side type of display is especially suitable for viewing from the print side or front facing side only, such as when mounted on an opaque surface. That is, a single-side display mounted on a solid wall, for example, is viewed only from the same side of the paper substrate on which the image is printed. Any suitable paper stock and inks can be used for printing the image, although fade resistant, oil based inks are particularly well suited. The choice of paper stock and ink depends to a large degree on the particular printing process utilized and the desired colors.

In accordance with this embodiment, a transparent overlay 18 is provided on both sides of the printed paper substrate as shown in FIG. 1. Although the overlay may be omitted from the print side, an overlay for that side affords protection to the image from smudges, abrasion, fading, heat, tearing, and the like. The transparent overlay preferably comprises a suitable plastic film, such as a polyolefin film or polyester film, having a thickness of from about 0.5 to 5 mils. Other suitable plastic film materials include polystyrene, polycarbonate, triacetylcellulose, cellophane, polyamide, polyimide, polyacrylonitrile, and polyvinyl acetate. The plastic overlay has essentially the same area dimensions as the paper substrate so as to be coterminus therewith. The overlay may be applied to the paper substrate with an adhesive, or the film may have a heat activated adhesive surface, and the film is bonded to the surface by heat and pressure. Alternatively, the transparent overlay 18 may comprise an aqueous base or petroleum base coating which can be applied to the paper substrate by any conventional means such as spraying, dipping, rolling, and the like. The applied coating composition may be air-curable or be rendered active or cured by heating at an elevated temperature of about 200°–500° F., by ultra violet light, or by infra red light. Suitable coatings include di-isodecyl phthalate (available from Akzo Coatings Inc., Zion, Ill.), or acrylate base and bisphenol-A base epoxy compositions (available from Pierce & Stevens Corp., Buffalo, N.Y.). The resulting coating desirably has a thickness of from about 0.05 to 2 mils. Both aqueous base and petroleum base coatings can be provided at relatively low costs and provide adequate protection without blurring the image. A petroleum base coating cured with ultraviolet light usually provides stronger protection than the aqueous base coatings.

An anchor coating or primer surface 20 is applied to or formed on the overlay of the back facing or side of the display, i.e. the facing opposite the image, in order to enhance the bonding of the adhesive to the overlay. This adhesive-enhancing treatment provides proper bonding between the overlay and the adhesive 22, described below in detail, such that the bond between the adhesive and the overlay is stronger than the bond between the adhesive and the mounting surface. One method of enhancing the surface of the overlay is to apply a size such as an adhesive or resin. Size compositions for this purpose are known in the art and are available, and the particular size used in preparing the display will depend on such factors as the method of application, the composition of the overlay, and the composition of the adhesive, and can be determined by one having skill in the art. A suitable size composition comprises an acrylic water-based adhesive with a polyurethane dispersion base having a viscosity of about 10,000 to 15,000 mPas (Brookfield RTV, Sp.7, 20r/min.), a solids content of about 44–46 weight percent, and a pH of about 7 to 8, and sold under the trade name Mecotherm D 3046/5 by KIWO, Inc., Seabook, Tex. The size typically is applied to the plastic overlay in a liquid state as by silk screening, or by roll coating, or by a tower coater, and is applied to a thickness of about 0.5 to 1.5 mils over the entire surface of the overlay so as to be coextensive therewith. The size is allowed to dry, and typically to the touch appears to have essentially no tack.

In an alternative embodiment of the invention, the surface of the overlay may be primed or activated by corona discharge, ultraviolet irradiation, plasma treatment, flame treatment, or the like, which surface activation treatments are well known in the art. Preferably, surface treatment is achieved by high-voltage electrostatic corona discharge, such as described, for example, in U.S. Pat. No. 4,363,640, by passing the paper substrate over ceramic electrodes operated at frequencies ranging from about 10 KHZ to 35 KHZ at voltages ranging from about 6,000 to 10,000 volts.

The overlay bearing the primed or activated surface is then coated with a pressure-sensitive, replaceable adhesive 22. The adhesive coating may be applied by any conventional means such as silk screening, roll coating, tower coating, or the like, and at a thickness of about 0.5 to 1.5 mil over the entire overlay so as to be substantially coterminus therewith. Pressure-sensitive, replaceable adhesives useful for my invention typically comprise an admixture of an elastomer and a tackifier, and also may include other constituents such as a plasticizer, antioxidant, etc. Suitable elastomers used, for example, are natural or synthetic rubber, polyacrylates and acrylate esters, polyisobutylene, and block copolymers, and commonly used tackifying agents include gum rosin, rosin esters, polyterpene resins, oil-soluble phenolic resins, and petroleum hydrocarbon resins. These suitable pressure sensitive adhesives are well known and are commercially available, and a useful adhesive for this invention is acrylic water-based adhesives having a viscosity of 10,000 to 14,000 mPas (Rheomat STV, measurement system C1,20C), a solids content of about 54 wt. %, and a pH of about 6–7. This adhesive is sold under the trade name Kiwoprint D 177 by KIWO, Inc., Seabook, Tex.

Test samples of the advertising display prepared in accordance with this embodiment of the invention were prepared using a plastic overlay designated HP10010-P from Protectall, Inc., Darien, Wis. (a polyester-polyethylene laminate chemically primed on the polyester side), and coated with Kiwoprint D 177. These samples were mounted on an indoor window and removed eight weeks later. All of the test samples left essentially no visibly noticeable residue. In comparison, three samples were prepared consisting of (1) no transparent overlay and no primer (e. g., no size or corona treatment) but only a coating of the same adhesive, (2) no transparent overlay, but had both a size and adhesive, and (3) transparent overlay and adhesive only. All three of the comparison samples left a residue after only one week of application on the window.

In an alternative embodiment, there is provided a replaceable adhesive display with different images 14 and 15 printed on each side of the display, as with the single-side display, in halftones by offset lithography. The double-side, different image display utilizes a paper stock 12 having sufficient opaqueness to present each image without the other image showing through the paper. The opacity of paper is typically calculated on a Bausch and Lomb Opacimeter. The opacity to weight ratio represents the degree of show-through of printed matter on the reverse side of the paper being measured, and the value therefore varies depending on the basis weight of the paper. For most offset lithography, paper suitable for two-side different image displays made in accordance with the present invention has an opacity value greater than about 83, and preferably greater than about 91. One to thirty six point paper, which may be coated on both sides and designed for offset lithography, is particularly useful. Paper has a smooth finish which enhances the colors, has a greater affinity for ink, excellent ink holdout, and produces excellent halftone prints with sharp definition. Suitable aluminum foil having a thickness of about two to twenty four points is particularly useful as the substrate for the invention. Any suitable inks can be used for printing the images and, as with the one-sided displays, the choice of ink depends on such factors as type and grade of paper, printing process, and the desired colors.

In offset lithography, a printing plate comprising halftone dots is prepared first for the front image 14 on the front facing of the paper substrate 12. The front facing 14 of the paper substrate 12 is then printed in conventional manner using the appropriate paper and inks. Thereafter, the substrate 12 is reversed, and a back image 15 is printed on the back facing using a second printing plate also comprising halftone dots.

Similar to the one-side display, both sides of the printed substrate are provided with a transparent overlay 18 such as a plastic film laminate, or an aqueous or petroleum based coating. A surface-enhancing treatment at 20 comprising a size, corona treatment, etc., as described above, is applied over the transparent layer 18. A pressure sensitive, replaceable adhesive coating 22, such as an adhesive comprising an acrylic water-based adhesive with an aqueous acrylic dispersion base, is then applied over the surface-enhancing layer 20. Finally, if desired, a low release liner (not shown) is placed over the adhesive coating 22 to protect the coating 22 from dust and debris until ready for application to a mounting surface.

In yet another embodiment of the present invention, the same image is printed on both sides of the paper substrate. Such displays, mounted for example on a store window, utilize both reflective light and transmitted light to present an enhanced image to the viewer. In other words, a viewer looking at the front of the display sees a front image 14 printed on the front facing of the substrate by virtue of reflective light and also sees a back image 16 printed on the back facing by virtue of transmitted light passing through the substrate. Such a display is known in the advertising industry as a "translite." A paper translite is disclosed in the co-pending application Ser. No. 08/012,569, filed Jan. 2, 1993, now U.S. Pat. No. 5,273,796, in which applicant is a co-inventor, which application is incorporated by reference into this specification.

The replaceable adhesive display useful as a translite, as described for this embodiment of the present invention, utilizes a paper stock 12 having sufficient translucency, i.e., low opacity, to achieve an image enhancement from transmitted light cast from its backside. For most offset lithography, paper suitable for the translites has an opacity value less than about 95, and preferably less than about 88, as measured on a Bausch and Lomb Opacimeter. Additionally, paper most suitable for the translite exhibits high whiteness, most commonly specified in terms of a requirement for brightness, a standard measurement in paper industry and determined under standardized conditions by the percentage of reflectance from the paper of a certain wavelength of blue light. For offset lithography, paper suitable for translites has a brightness of not less than about 60, and preferably not less than about 80. Desirably, the paper stock for translites exhibits relatively low opacity and high brightness.

For a replaceable adhesive translite, the front facing of the paper substrate is printed with a right reading image 14, and the back facing thereof is printed with the same image but in reverse imaging 16 and of the same colors. Each of the two images 14 and 16, whether of a picture, letters, characters, etc., is virtually identical. In the printing process, a printing plate comprising halftone dots is prepared first for the right reading image. The front facing of the paper substrate is then printed in conventional manner with the right reading image 14, using the appropriate paper and inks. Thereafter, the substrate 12 is reversed, and a reverse image 16 is printed on the back facing using a printing plate comprising halftone dots.

The image for the front facing, i.e., right reading image 14, is printed as high quality reflective art. It is essential for purposes of producing a translite display that the reverse image 16 have substantially dot-for-dot registration with the right reading image 14. The image for the back facing, i.e., the reverse image 16, may have substantially the same, or preferably, a lower percentage of halftone dots than the printing for the right reading for the front facing. If the image area reproduced in halftones is light, it then may be desirable to have the reverse image with about or near 100% of halftone dots for that used for the front facing. The darker the image area in halftones, the lower percentage of halftone dots is more desirable. The same ink for each halftone color may be used for both the front facing and the back facing, or where desired, the ink density of the ink used for the back facing may be of lower value than the ink density of the ink used for the front facing. If the reverse image is printed with a lower percentages of halftone dots or with an ink having a lower ink density, the tone is of lighter value for each color relative to the same color for the right reading. Thus, in accordance with the one embodiment, the reverse image is printed with a skeletal reverse image. The term "skeletal" or "skeleton" as used herein means a reduced reproduction of the halftone especially of the middle tones and highlights. That is, the printing plate for the reverse image 16 printed on the back facing of the substrate 12 has a lower percentage of halftone dots than the printing plate for the right reading image 14 for the front facing. The same ink for each halftone color is used for both the front facing and the back facing, or where desired, the ink density of the ink used for the back facing may be of lower value than the ink density of the ink used for the front facing. If the reverse image is printed with a lower percentage of halftone dots or with an ink having a lower ink density, the tone of the reverse image 16 is of lighter value for each color relative to the same color for the right reading image 14. The percentage of halftone for the reverse image 16 should preferably be about 10 to 90 percent, highlight to shadow, respectively, of that of the right reading image 14, but this percent can vary depending largely on the ink color and the tonal value desired for the end product.

These differences in halftone between the reverse image 14 and right reading image 16 may result in each color for the reverse image 16 having a lighter value relative to the same color for the right reading image, thereby enhancing one or more color attributes when the translite is illuminated from the back and viewed from the front. The colors observed by the viewer of the translite appear especially vivid or brilliant, and true in color. The resulting translite is equally pleasing viewed by reflective light only as viewed by transmitted light, and the translite is further characterized by an enhancement is one or more color attributes when illuminated from the back facing and viewed from the front facing.

As above with reference to the other embodiments, the translite display is provided with a transparent overlay 18, then one side of the overlay (the exposed side or facing) is treated at 20 to provide for surface enhancement, and then provided with a replaceable adhesive coating 22. The adhesive may optionally be covered with a release liner.

It should be recognized that the present invention utilizes well-known printing processes and available adhesive materials. Comparable processes and materials may be substituted for the specific items listed here. Also, no claim is individually made to these earlier known processes and materials. Rather the invention presented herein resides in the combination of these processes and materials together with the additional processes and materials described above. Therefore, specific details disclosed above are not to be interpreted as limiting, but merely as a basis of the claims and for teaching one skilled in the art to practice the present invention in any appropriately detailed manner. Changes may be made in the details of production or construction of the invention without departing from the spirit of the invention, especially as defined in the following claims.

What is claimed is:

1. A replaceable adhesive display for mounting on a surface, comprising:

(a) a substrate selected from the group consisting of paper, metallized paper, and foil, said substrate having a front facing and a back facing, and an image printed on at least one of said facings;

(b) a transparent overlay disposed on at least one of said facings, said overlay having an outwardly disposed adhesive-enhancing surface; and (c) a pressure sensitive, replaceable adhesive coating applied to said adhesive-enhancing surface, whereby said display can be sealed and unsealed several times on said mounting surface.

2. A replaceable adhesive display for mounting on a surface, comprising:

(a) a substrate selected from the group consisting of paper, metallized paper, and foil, said substrate having a front facing and a back facing;

(b) an image printed on said front facing;

(c) a transparent overlay disposed over said back facing, said overlay provided with an adhesive-enhancing surface; and (d) a pressure sensitive, replaceable adhesive coating applied to said adhesive-enhancing surface, whereby said display can be sealed and unsealed several times on said mounting surface.

3. A replaceable adhesive display according to claim 1 wherein said substrate is paper and said overlay is a plastic film.

4. A replaceable adhesive display according to any of claims 1, 2 or 3 wherein a second overlay is provided on the opposite facing of said substrate.

5. A replaeable adhesive display according to any one of claims 1, 2 or 3 further including a release liner disposed over said adhesive.

6. A replaceable adhesive display according to any one of claims 1, 2 or 3 further comprising a second image printed on the opposite facing of said substrate, and a transparent overlay disposed over said second printed image.

7. A replaceable adhesive display according to claim 6 wherein said substrate is opaque paper, and said second printed image is different from the other printed image.

8. A replaceable adhesive display according to claim 6 wherein said paper is translucent having low opacity and high brightness, one facing thereof having an image area of a right reading in one or more colors, and on the opposite facing thereof a second image area but of a reverse image and of the same colors, said image area of said reverse image having substantially dot-for-dot registration with the image area of said right reading, each of said image areas made from printing plates bearing halftone dots, the printing plate used for printing the image area for the reverse image having the same or a lower percentage of halftone dots than the printing plate used for printing the image area for the right reading.

9. A replaceable adhesive display according to claim 8 wherein the percentage of halftone dots for the image area of the reverse image is about 10 to 90 percent, highlight to shadow, respectively, of the halftone dots for the image area of the right reading, thereby resulting in a lighter value for each color of the reverse image relative to the same color of the right reading.

10. A replaceable adhesive display according to claim 8 wherein the ink density for the ink used for the halftone dots for the image area of the reverse image is of lower value than the ink density for the ink used for the halftone dots for the image area of the right reading, thereby resulting in a lighter value for each color of the reverse image relative to the same color of the right reading.

11. A replaceable adhesive display according to claim 2 wherein said substrate is paper and said overlay is a plastic film.

12. A replaceable adhesive display according to claim 2 or claim 11 wherein a second overlay is provided on the opposite facing of said substrate.

13. A replaceable adhesive display according to claim 2 or claim 11 further including a release liner disposed over said adhesive.

14. A replaceable adhesive display according to claim 2 or claim 11 further comprising a second image printed on the opposite facing of said substrate, and a transparent overlay disposed over said second printed image.

15. A replaceable adhesive display according to claim 14 wherein said substrate is opaque paper, and said second printed image is different from the other printed image.

16. A replaceable adhesive display according to claim 14 wherein said paper is translucent having low opacity and high brightness sufficient to achieve an image enhancement from transmitted light cast from said back facing of said display, one facing thereof having an image area of a right reading in one or more colors, and on the opposite facing thereof a second image area but of a reverse image and of the same colors, said image area of said reverse image having substantially dot-for-dot registration with the image area of said right reading, each of said image areas made from printing plates bearing halftone dots, the printing plate used for printing the image area for the reverse image having the same or a lower percentage of halftone dots than the printing plate used for printing the image area for the right reading.

17. A replaceable adhesive display according to claim 16 wherein the percentage of halftone dots for the image area of the reverse image is about 10 to 90 percent, highlight to shadow, respectively, of the halftone dots for the image area of the right reading, thereby resulting in a lighter value for each color of the reverse image relative to the same color of the right reading.

18. A replaceable adhesive display according to claim 16 wherein the ink density for the ink used for the halftone dots for the image area of the reverse image is of lower value than the ink density for the ink used for the halftone dots for the image area of the right reading, thereby resulting in a lighter value for each color of the reverse image relative to the same color of the right reading.

19. A method of producing a replaceable adhesive display, comprising:

(a) selecting a substrate selected from the group consisting of paper, metallized paper, and foil, said substrate having a front facing and a back facing;

(b) printing an image on said front facing of said substrate;

(c) overlaying a transparent film over one or both of said facings;

(d) providing an adhesive-enhancing surface to one of said transparent films;

(e) coating the resulting adhesive-enhancing surface with a pressure sensitive, replaceable adhesive.

20. A method according to claim 19, and further including providing a release liner over said replaceable adhesive.

21. A method according to claim 20 wherein said substrate is paper, and said transparent film is plastic.

* * * * *